(12) United States Patent
Jeon et al.

(10) Patent No.: US 12,626,997 B2
(45) Date of Patent: May 12, 2026

(54) BATTERY MODULE AND BATTERY PACK HAVING BATTERY MODULE

(71) Applicant: SK On Co., Ltd., Seoul (KR)

(72) Inventors: Hae Ryong Jeon, Daejeon (KR); Kang Gu Lee, Daejeon (KR)

(73) Assignee: SK On Co., Ltd., Seoul (KR)

( * ) Notice: Subject to any disclaimer, the term of this patent is extended or adjusted under 35 U.S.C. 154(b) by 576 days.

(21) Appl. No.: 18/095,533

(22) Filed: Jan. 11, 2023

(65) Prior Publication Data

US 2023/0231266 A1     Jul. 20, 2023

(30) Foreign Application Priority Data

Jan. 20, 2022     (KR) ........................ 10-2022-0008697

(51) Int. Cl.
| | |
|---|---|
| *H01M 50/383* | (2021.01) |
| *H01M 10/643* | (2014.01) |
| *H01M 10/658* | (2014.01) |
| *H01M 50/107* | (2021.01) |
| *H01M 50/213* | (2021.01) |

(Continued)

(52) U.S. Cl.
CPC ....... *H01M 50/383* (2021.01); *H01M 10/643* (2015.04); *H01M 10/658* (2015.04); *H01M 50/107* (2021.01); *H01M 50/213* (2021.01); *H01M 50/258* (2021.01); *H01M 50/271* (2021.01); *H01M 50/503* (2021.01); *H01M 50/588* (2021.01); *H01M 50/593* (2021.01)

(58) Field of Classification Search
CPC .. H01M 10/52; H01M 10/643; H01M 10/658; H01M 50/107; H01M 50/213; H01M 50/258; H01M 50/271; H01M 50/35; H01M 50/367; H01M 50/383; H01M 50/502; H01M 50/503; H01M 50/526; H01M 50/588; H01M 50/593; Y02E 60/10
See application file for complete search history.

(56) References Cited

U.S. PATENT DOCUMENTS

| | | | |
|---|---|---|---|
| 10,707,462 B1 * | 7/2020 | Lane .................... | H01M 10/653 |
| 2009/0197153 A1 * | 8/2009 | Fujikawa .............. | H01M 50/30 |
| | | | 429/82 |

(Continued)

FOREIGN PATENT DOCUMENTS

| | | |
|---|---|---|
| EP | 3460870 A1 | 3/2019 |
| JP | 2014197452 A | 10/2014 |

(Continued)

OTHER PUBLICATIONS

Machine translation JP2014197452A (Year: 2014).*

(Continued)

*Primary Examiner* — Victoria H Lynch
(74) *Attorney, Agent, or Firm* — IP & T GROUP LLP

(57)     ABSTRACT

A battery module includes a cell assembly including a plurality of battery cells, and a module housing having an arrangement space for accommodating the cell assembly and a cover plate covering a top surface of the cell assembly. The cover plate has at least one discharge hole for discharging gas generated in the cell assembly. A blocking member is disposed between the top surface of the cell assembly and the cover plate to block flame or a combustion material from being discharged externally of the module housing through the discharge hole.

16 Claims, 6 Drawing Sheets

(51) Int. Cl.

| | |
|---|---|
| *H01M 50/258* | (2021.01) |
| *H01M 50/271* | (2021.01) |
| *H01M 50/503* | (2021.01) |
| *H01M 50/588* | (2021.01) |
| *H01M 50/593* | (2021.01) |

(56) References Cited

U.S. PATENT DOCUMENTS

| | | | |
|---|---|---|---|
| 2012/0114993 | A1 | 5/2012 | Park et al. |
| 2012/0164490 | A1 | 6/2012 | Itoi et al. |
| 2017/0033343 | A1 | 2/2017 | Miyawaki |
| 2019/0252652 | A1 | 8/2019 | Guillemard et al. |
| 2021/0159567 | A1 | 5/2021 | Pires et al. |
| 2021/0288372 | A1 | 9/2021 | Kim et al. |
| 2022/0059901 | A1 | 2/2022 | Ren et al. |
| 2022/0223974 | A1* | 7/2022 | Zbiral ................. H01M 50/394 |
| 2023/0083113 | A1 | 3/2023 | Lee et al. |

FOREIGN PATENT DOCUMENTS

| | | | |
|---|---|---|---|
| JP | 2016-110881 | A | 6/2016 |
| KR | 10-2012-0049020 | A | 5/2012 |
| KR | 10-2012-0090027 | A | 8/2012 |
| KR | 10-2017-0015141 | A | 2/2017 |
| KR | 102149439 | B1 | 8/2020 |
| KR | 102220693 | B1 | 3/2021 |
| KR | 20210108452 | A | 9/2021 |
| KR | 20210117632 | A | 9/2021 |

OTHER PUBLICATIONS

Extended European Search Report issued by the EPO for Application No. 23151167.6, dated Jun. 19, 2023.

Office Action for the Korean Patent Application No. 10-2022-0008697 issued by the Korean Intellectual Property Office on Feb. 6, 2024.

* cited by examiner

200

II-II'

200

III-III'

BATTERY MODULE AND BATTERY PACK HAVING BATTERY MODULE

CROSS-REFERENCE TO RELATED APPLICATION(S)

This application claims benefit of priority to Korean Patent Application No. 10-2022-0008697 filed on Jan. 20, 2022 in the Korean Intellectual Property Office, the disclosure of which is incorporated herein by reference in its entirety.

TECHNICAL FIELD

The present disclosure relates to a battery module including a plurality of battery cells including a secondary battery, and a battery pack having the battery module, and more particularly, to a battery module capable of easily discharging gas and a battery pack having the battery module.

BACKGROUND

Unlike primary batteries, secondary batteries may be charged and discharged, and thus are applicable to devices within various fields such as digital cameras, mobile phones, notebook computers, hybrid vehicles, and electric vehicles. Examples of the secondary battery may include a lithium secondary battery, a nickel-cadmium battery, a nickel-metal hydride battery, and a nickel-hydrogen battery.

Such a secondary battery is manufactured as a pouch-type battery cell having flexibility or a prismatic or cylindrical can-type battery cell having rigidity. A plurality of battery cells may form a cell assembly. The cell assembly is disposed within a case (housing or frame) to be included in a battery device such as a battery module or a battery pack.

US Patent Application Publication No. 2021/0159567 A1 discloses a battery module having a plurality of battery cells. According to the US Patent Application Publication, a cylindrical can-type secondary battery for accommodating an electrode assembly in a rigid casing is used as a battery cell.

According to the US Patent Application, cooling of a battery cell is performed in order to prevent ignition or explosion in the battery cell caused due to a rise in internal temperature of the battery module. Specifically, the US Patent Application Publication discloses a configuration in which a cooling channel in contact with the battery cell is formed between battery cells and the cooling channel is extended externally of the battery module.

However, ignition of a battery cell may occur in various events or situations, such as when a lifespan of the battery cell reaches an end point, when a swelling phenomenon occurs in the battery cell, when the battery cell is overcharged, when the battery cell is exposed to heat, when a sharp object such as a nail passes through a casing of a battery cell, when an external shock is transferred to the battery cell, and the like. Accordingly, ignition of the battery cell may not be prevented only with cooling of the battery cell.

Accordingly, in the US Patent Application Publication, an ignition phenomenon may occur in the battery cell when an event occurs. In particular, when some battery cells are ignited, fire may rapidly spread to adjacent battery cells, and internal pressure of the battery module may rapidly rise due to a flame, a combustion material, and high-temperature gas (including electrolyte gas and combustion gas). A rise in internal pressure of the battery module may lead to damage, breakage, or explosion of the battery module, and thus the flame may be exposed externally of the battery module. The flame exposed externally of the battery module may be rapidly propagated by successive ignition of adjacent battery modules. In addition, since a plurality of battery modules included in a battery pack is installed in a vehicle or energy storage system (ESS), fire generated in the battery modules may spread rapidly, leading to a large-scale fire in the entire vehicle or ESS.

SUMMARY

An aspect of the present disclosure provides a battery module capable of delaying or minimizing external exposure of flame even when a fire occurs within the battery module, and a battery pack having the battery module.

Another aspect of the present disclosure provides a battery module capable of stably discharging gas generated in the battery module externally, and a battery pack having the battery module.

Another aspect of the present disclosure provides a battery module capable of delaying or preventing successive ignition of battery cells by blocking transfer of flame or high-temperature heat between adjacent battery cells, and a battery pack having the battery module.

According to an aspect of the present disclosure, there is provided a battery module including a cell assembly including a plurality of battery cells, and a module housing having an arrangement space for accommodating the cell assembly and a cover plate covering a top surface of the cell assembly. The cover plate may have at least one discharge hole for discharging gas generated in the cell assembly. A blocking member may be disposed between the top surface of the cell assembly and the cover plate to block flame or a combustion material from being discharged externally of the module housing through the discharge hole.

The plurality of battery cells may comprise can-type secondary batteries having a plurality of electrode terminals. At least one of the plurality of electrode terminals may be disposed toward the cover plate.

The plurality of battery cells may comprise can-type secondary batteries including a casing accommodating the electrode assembly and a cap plate covering an open portion of the casing. The cap plate may be disposed toward the cover plate.

The plurality of battery cells may comprise cylindrical secondary batteries. The plurality of battery cells may be arranged in an upright state in the arrangement space.

An electrode connection member electrically connected to the cell assembly may be disposed between the cell assembly and the blocking member. Here, the electrode connection member may include an electrically insulating supporting plate and an electrically conductive bus bar supported by the supporting plate.

The blocking member may include a mesh filter having a pore.

The blocking member may include at least one of a porous metal foam, a metal mesh, and a non-metal porous body.

The blocking member may include a metal material or a non-metal material having a melting temperature of 500° C. or higher.

The cell assembly may include an insulating member disposed between the battery cells to block flame or high-temperature heat energy between adjacent battery cells.

The cover plate may include a plurality of discharge holes, and the plurality of discharge holes may be disposed in at least one row.

According to another aspect, there is provided a battery pack including a pack case including a bottom case and a cover case coupled to each other to form an accommodation space, and at least one battery module accommodated in the pack case. The at least one battery module may include a cell assembly including a plurality of battery cells, a module housing having an arrangement space for accommodating the cell assembly and a cover plate covering a top surface of the cell assembly, and a blocking member disposed between the top surface of the cell assembly and the cover plate. The cover plate may have at least one discharge hole for discharging gas generated in the cell assembly. The cover case may have at least one guide groove to form a flow space in which the gas discharged through the discharge hole flows. The gas flowing through the flow space may be discharged externally through a venting unit provided in the pack case.

The cover plate may include a plurality of discharge holes, and the plurality of discharge holes may be disposed in at least one row. In the cover case, the number of the at least one guide groove may correspond to the number of rows formed by the plurality of discharge holes.

The cover case and the cover plate may be disposed in close contact with each other at an edge of the guide groove.

The venting unit may be disposed on a side wall of the pack case. A flow guide member may be disposed between the battery module and the venting unit and the f low guide member may guide the gas flowing through the flow space formed by the guide groove to be discharged through the venting unit.

The flow guide member may have a guide portion disposed to be spaced apart from an inner surface of the side wall of the pack case such that the gas is guided to flow along the inner surface of the side wall of the pack case and then to be discharged through the venting unit, and a blocking portion extending from the guide portion toward the inner surface of the side wall of the pack case to block a space between the venting unit and a bottom surface of the bottom case.

An additional blocking member may be disposed between the flow guide member and the venting unit to block flame or a combustion material from being discharged externally of the pack case through the venting unit.

According to example embodiments of the present disclosure, external exposure of flame may be delayed or minimized even when a fire occurs within the battery module.

In addition, gas generated within the battery module may be stably discharged externally.

In addition, successive ignition of battery cells may be delayed or prevented by blocking transfer of flame or high-temperature heat between adjacent battery cells.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
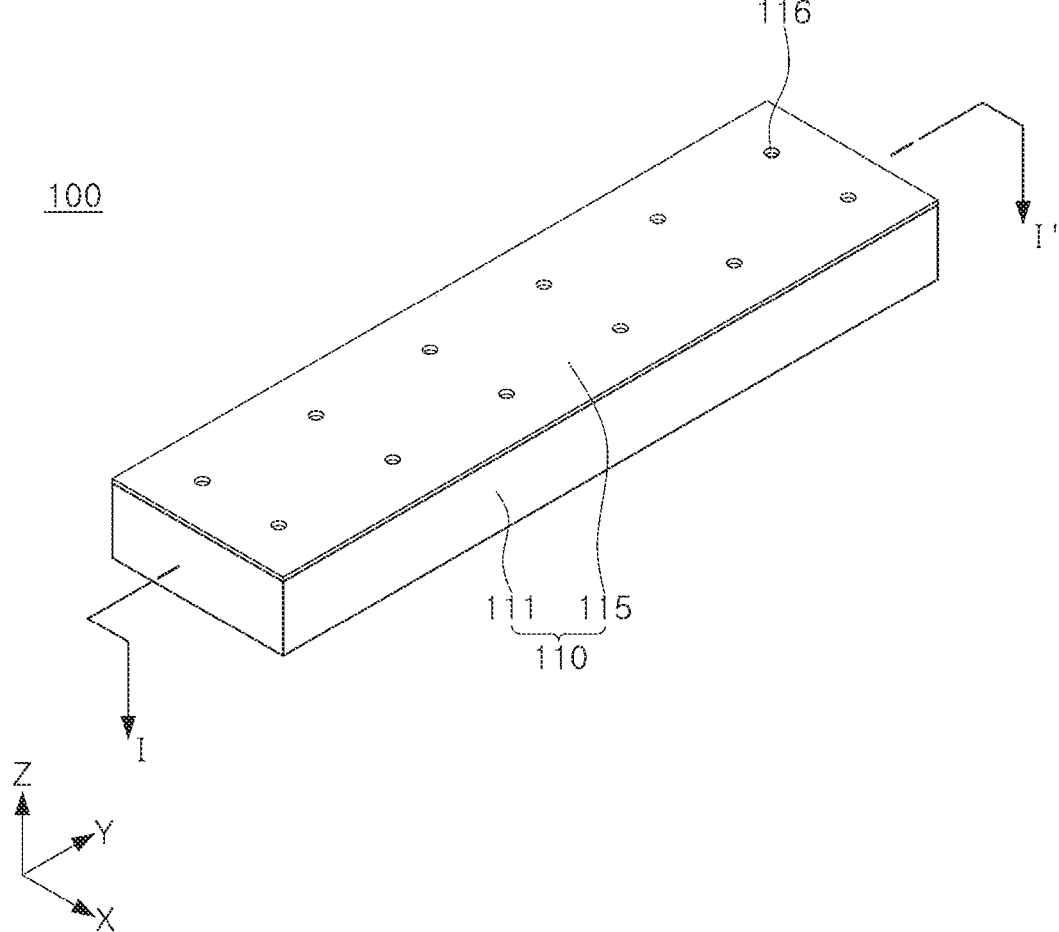
FIG. 1 is a perspective view of a battery module according to an example embodiment of the present disclosure.

Hereinafter, preferred example embodiments of the present disclosure are described hereafter in detail with reference to the accompanying drawings. Before describing the example embodiments, the words and terminologies used in the specification and claims should not be construed with common or dictionary meanings, but construed as meanings and conception coinciding the spirit of the invention under a principle that the inventor(s) can appropriately define the conception of the terminologies to explain the invention in the optimum method. Therefore, example embodiments described in the specification and the configurations illustrated in the drawings are not more than the most preferred example embodiments of the present disclosure and do not fully cover the spirit of the present disclosure. Accordingly, it should be understood that there may be various equivalents and modifications that can replace those when the present application is filed.

Hereinafter, preferred example embodiments of the present disclosure will be described in detail with reference to the accompanying drawings. In this case, it should be noted that the same components are denoted by the same reference numerals in the accompanying drawings. In addition, detailed descriptions of well-known functions and configurations that may obscure the gist of the present disclosure will be omitted. For the same reason, some components are exaggerated, omitted, or schematically illustrated in the accompanying drawings, and the size of each component does not fully reflect the actual size.

First, a battery module 100 according to an example embodiment of the present disclosure will be described with reference to FIGS. 1 to 4.

Figure 2:
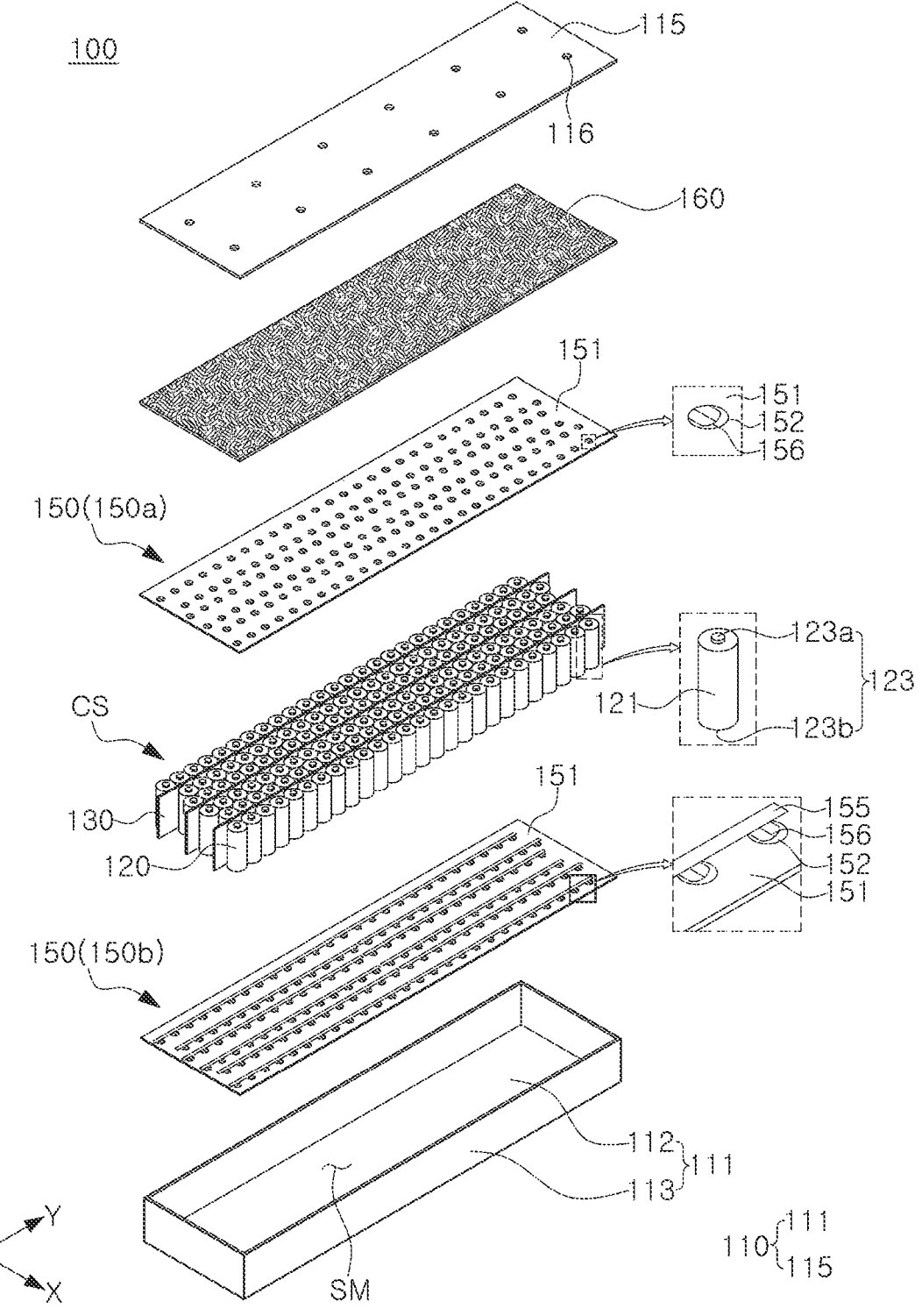
FIG. 2 is an exploded perspective view of the battery module illustrated in FIG. 1.
Figure 3:
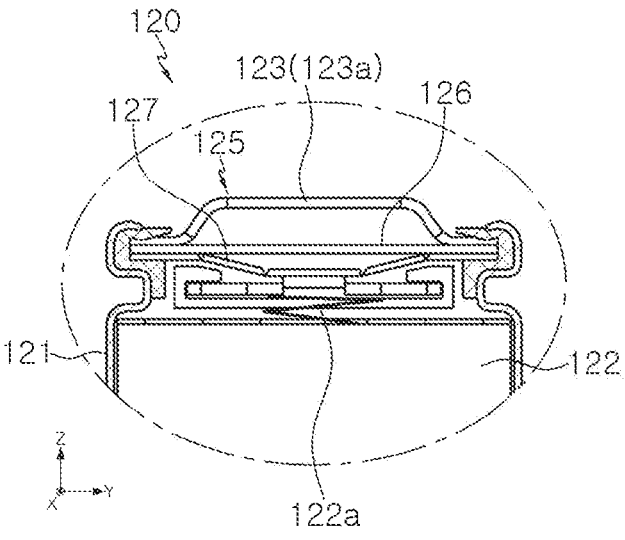
FIG. 3 is a cross-sectional view illustrating an example of a battery cell.
Figure 4:
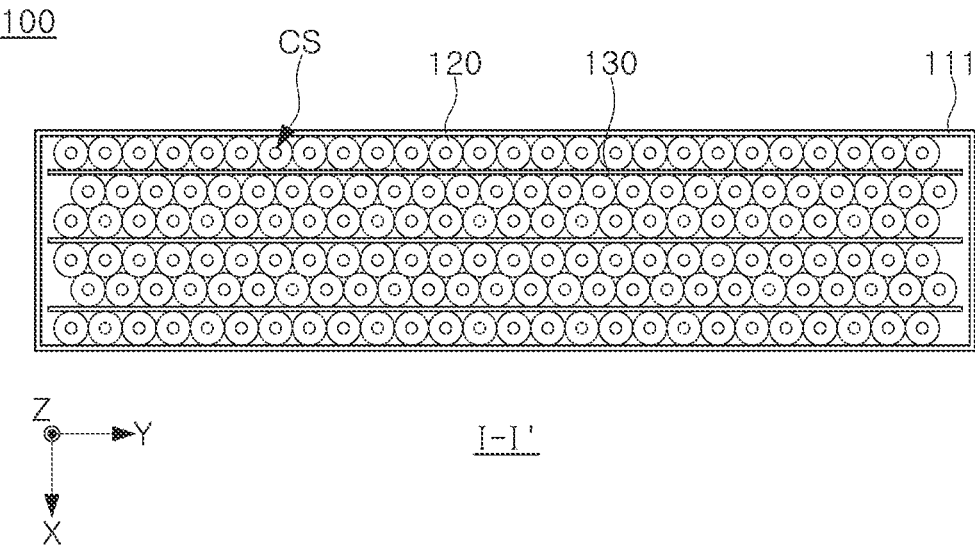
FIG. 4 is a cross-sectional view taken along line I-I' of FIG. 1.

FIG. 1 is a perspective view of a battery module 100 according to an example embodiment of the present disclosure. FIG. 2 is an exploded perspective view of the battery module 100 illustrated in FIG. 1. FIG. 3 is a cross-sectional view illustrating an example of a battery cell 120. FIG. 4 is a cross-sectional view taken along line I-I' of FIG. 1.

Referring to FIGS. 1 and 2, the battery module 100 according to an example embodiment of the present disclosure may include a cell assembly CS, a module housing 110, an electrode connection member 150, and a blocking member 160.

The module housing 110 may form an arrangement space SM for accommodating the cell assembly CS. The module housing 110 may protect the cell assembly CS accommodated in the arrangement space SM from an external environment.

The module housing 110 may include a housing body 111 forming the arrangement space SM, and a cover plate 115 coupled to the housing body 111 to cover the arrangement space SM. The housing body 111 and the cover plate 115 may be formed of a metal material having high heat conductivity, but the material is not limited thereto.

The housing body 111 may include a bottom plate 112 and a plurality of side plates 113 extending from an edge of the bottom plate 112 toward the cover plate 115. The bottom plate 112 and the plurality of side plates 113 may be separately manufactured and then coupled to each other by welding or the like. Alternatively, at least a portion of the bottom plate 112 and the side plates 113 may be integrally formed.

The cover plate 115 may be coupled to the housing body 111 to cover a top surface of the cell assembly CS. As a method of coupling the cover plate 115 and the housing body 111 to each other, various methods such as welding and the like may be used.

The cover plate 115 may have at least one discharge hole 116 for discharging gas generated in the cell assembly CS accommodated in the arrangement space SM ("gas" is defined herein as including electrolyte gas and combustion gas) externally of the module housing 110.

The cover plate 115 may have a plurality of discharge holes 116. The plurality of discharge holes 116 may form at least one row. For example, the cover plate 115 may have a plurality of discharge holes 116 disposed in two rows in a longitudinal direction Y of the module housing 110. The number of discharge holes 116 provided in the cover plate 115 and the number of rows formed by the plurality of discharge holes 116 may be changed in various manners.

The cell assembly CS may include a plurality of battery cells 120. The battery cell 120 may include a secondary battery. For example, the battery cell 120 may include a lithium secondary battery, a nickel-cadmium battery, a nickel-metal hydride battery, a nickel-hydrogen battery, and the like.

The battery cell 120 may include a can-type secondary battery in which an electrode assembly (122 of FIG. 3) is accommodated in a casing 121 having rigidity. The can-type secondary battery may be classified into a cylindrical secondary battery and a prismatic secondary battery depending on an external shape thereof. In the detailed description, the cylindrical secondary battery is exemplified as the battery cell 120. However, in the detailed description and claims, the prismatic secondary battery is not excluded as the battery cell 120.

The battery cell 120 may include the cylindrical secondary battery, and the plurality of battery cells 120 are arranged in an upright state in the arrangement space SM. The cell assembly CS include the plurality of battery cells 120 arranged in an upright state in a third direction (vertical direction) Z. The battery cell 120 may include a plurality of electrode terminals 123 (123a and 123b), and at least one electrode terminal 123a may be disposed toward the cover plate 115.

Terms indicating front, rear, left, right, up, and down directions described herein may vary depending on a position of an observer or a shape of an object placed. However, for ease of description, the terms indicate the front, rear, left, right, up, and down directions in a distinguished manner, when viewed in a +Y direction on an X-Y plane.

A detailed description of the battery cell 120 will be described below with reference to FIG. 3.

The cell assembly CS may include a heat insulating member 130 disposed between at least some of the battery cells 120. The heat insulating member 130 may block propagation of flame or high-temperature heat energy between adjacent battery cells 120. Accordingly, the heat insulating member 130 may prevent a successive ignition phenomenon from occurring within the cell assembly CS.

FIG. 2 illustrates a configuration in which three heat insulating members 130 are disposed between the battery cells 120 in a longitudinal direction Y of the battery module 100, but the number and installation positions of the heat insulating members 130 may be changed in various manners.

The heat insulating member 130 may include a material having at least one property among flame retardancy, heat resistance, heat insulation, and insulation. Here, the heat resistance may refer to a property in which a shape does not change without being melted even at a temperature of 500° C. or higher, and the heat insulation may refer to a property in which a heat conductivity is 1.0 W/mK or less. In order to secure higher heat insulation, the heat conductivity may have a value of 0.5 W/mK or less, or 0.3 W/mK or less. The flame retardancy, a property of preventing or inhibiting self-combustion when a fire source is removed, may refer to, for example, a grade of V-0 or higher in UL94 V Test. The insulation may refer to a property in which electricity is not easily transferred, for example, a material belonging to a comparative tracking index (CTI) II group of 400V or higher in a 400V battery pack system.

For example, the heat insulating member 130 may include at least some materials among mica, silica, silicate, graphite, alumina, ceramic wool, and aerogel capable of performing a function of preventing propagation of heat and/or flame. However, a material of the insulating member 130 is not limited thereto, and various known materials may be used as long as it is possible to maintain a shape thereof in thermal runaway of the battery cell 120 and to prevent propagation of heat or flame to other adjacent battery cells 120.

The electrode connection member 150 may be disposed between a top surface of the cell assembly CS and the blocking member 160. The electrode connection member 150 may electrically connect the plurality of electrode terminals 123 (123a and 123b) provided in each battery cell 120. The electrode terminal 123 may include a first electrode terminal 123a and a second electrode terminal 123b having different polarities. As an example, a first electrode terminal 123a may be provided on an upper portion of the battery cell 120, and a second electrode terminal 123b may be provided on a lower portion of the battery cell 120. The electrode connection member 150 may include a first electrode connection portion 150a connected to the electrode terminal 123 disposed on the top surface of the cell assembly CS, and a second electrode connection portion 150b connected to the electrode terminal 123 disposed on a lower surface of the cell assembly CS.

The electrode connection member 150 may include an electrically conductive bus bar 155 electrically connected to the electrode terminal 123, and an electrically insulating supporting plate 151 supporting the bus bar 155. The bus bar 155 may include a metal having excellent electrical conductivity. For example, the bus bar 155 may be formed of a copper alloy, an aluminum alloy, a nickel alloy, or the like. The supporting plate 151 may be formed of an electrically insulating synthetic resin.

In order to increase connection force between the bus bar 155 and the electrode terminal 123, the bus bar 155 may be connected to a connection piece 156 in contact with the electrode terminal 123. In addition, an opening 152 may be formed in the supporting plate 151 at a position corresponding to that of the connection piece 156.

For electrical connection between the bus bar 155 and the electrode terminal 123, the first electrode connection part 150a has a shape in which the bus bar 155 is disposed below the supporting plate 151, and the second electrode connection portion 150b may have a shape in which the bus bar 155 is disposed on the supporting plate 151.

In FIG. 2, with respect to all the battery cells 120 included in the cell assembly CS, the first electrode terminal 123*a* may be positioned on the top surface of the cell assembly CS, and the second electrode terminal 123*b* may be positioned on the lower surface of the cell assembly CS. In this case, the first electrode connection portion 150*a* may be connected to the first electrode terminal 123*a*, and the second electrode connection portion 150*b* may be connected to the second electrode terminal 123*b*. However, various changes may be applicable to the arrangement of the electrode terminals 123 of the battery cells 120 in the cell assembly CS. For example, in some battery cells 120, a first electrode terminal 123*a* may be disposed to be positioned on the top surface of the cell assembly CS, and in the other battery cells 120, the second electrode terminal 123*b* may be disposed to be positioned on the top surface of the cell assembly CS.

The bus bar 155 may be electrically connected to an external connection terminal (not illustrated) exposed externally of the battery module 100, and the external connection terminal may be provided for electrical connection with the outside of the battery module 100.

The blocking member 160 may be disposed between the top surface of the cell assembly CS and the cover plate 115. The blocking member 160 may block f lame and/or a combustion material from being discharged externally of the module housing 110 through the discharge hole 116. The electrode connection member 150 may be disposed on the top surface of the cell assembly CS, such that the blocking member 160 may be disposed between the first electrode connection portion 150*a* of the electrode connection member 150 and the cover plate 115.

When a fire occurs in the battery cell 120, a positive electrode material, a negative electrode material, an electrolyte, and the like may be scattered from the battery cell 120 as well as various combustion materials are generated. In particular, a temperature of high-temperature gas (including the electrolyte gas and the combustion gas) generated during a fire of the battery cell 120 is 400° C. or higher, such that the electrode connection member 150 may be melted and burned by high-temperature heat. That is, the supporting plate 151 of the electrode connection member 150 may be formed of an electrically insulating synthetic resin, such that the supporting plate 151 may have a low melting point to be easily burned in case of fire. The blocking member 160 may block the flame and/or combustion material from being discharged externally through the discharge hole 116.

The blocking member 160 may be installed to cover the discharge hole 116 within the battery module 100 so as to block the flame and/or combustion material from being exposed externally through the discharge hole 116.

The blocking member 160 may include a mesh filter having a pore. The mesh filter may include at least one of a porous metal foam, a metal mesh, and a non-metal porous body.

The blocking member 160 may be formed of a flame-retardant and heat-resistant material. The blocking member 160 may have a high melting point. For example, the blocking member 160 may include a metal material or a non-metal material having a melting point of 500° C. or higher, 600° C. or higher, or 1000° C. or higher.

A material of the metal foam or metal mesh may include at least one of stainless steel (for example, SUS316L), copper (Cu), nickel, titanium, silver, tungsten, aluminum, and alloys thereof. A material of the non-metal porous body may include silicon or ceramic. In the case of ceramic, silicon carbide (SiC), zirconia (ZrO$_2$), partially stabilized zirconia, or the like may be used as a non-metal porous body.

The porous metal foam may be formed by foaming the above-described metal material such as stainless steel or nickel. In addition, the blocking member 160 may include one metal mesh or have a structure in which two or more metal meshes are stacked.

The porous metal foam, the metal mesh, and the non-metal porous body may have a pore average size of 400 to 800 μm in a radial direction. When the pore average size is 400 μm or less, gas may not be smoothly discharged due to large resistance when the gas is discharged. In this case, electrolyte gas generated within the battery module 100 may not be smoothly discharged, such that secondary ignition such as thermal runaway may be accelerated. Conversely, when the pore average size exceeds 800 μm, the flame and/or combustion material may pass through the pore to be exposed externally. In this case, the effect of blocking the flame and/or combustion material may be reduced, and other components (including the battery module 100) adjacent to the battery module 100 may be successively ignited due to the flame and/or combustion material exposed externally of the battery module 100.

In addition, the blocking member 160 may further include at least one of a fire extinguishing material and a phase change material (PCM) according to an endothermic reaction. The fire extinguishing material may perform a function of extinguishing flame. The fire extinguishing material may include a fire extinguishing capsule obtained by manufacturing a material having a function of extinguishing fire in the form of a capsule, but the present disclosure is not limited thereto. In addition, the phase change material may lower a temperature of flame or gas by absorbing heat from flowing flame or high-temperature gas. The phase change material may include a phase change capsule obtained by manufacturing an organic material, an inorganic material, or a mixture thereof having a phase change property caused by an endothermic reaction in the form of a capsule, but the present disclosure is not limited thereto. Various materials are known as the fire extinguishing material and the phase change materials, and thus a detailed description thereof will be omitted.

Next, the battery cell 120 according to an example embodiment will be described with reference to FIG. 3.

The battery cell 120 may include a casing 121 having an open side (upper side), an electrode assembly 122 accommodated in the casing 121, and a cap plate 125 covering the open portion of the casing 121.

The casing 121 may be formed of a material having high electrical conductivity. For example, the casing 121 may include an aluminum or copper material. The casing 121 may have a cylindrical shape extending in a third direction (vertical direction) Z, and may be disposed in the module housing 110 in a state of being uprighted in the third direction Z. In this case, at least a portion of the cap plate 125 may be disposed toward the cover plate 115.

The electrode terminal 123 may be disposed on the casing 121 and the cap plate 125 in a state of being exposed externally. The electrode terminal 123 may include a first electrode terminal 123*a* and a second electrode terminal (123*b* in FIG. 2). For example, the first electrode terminal 123*a* and the second electrode terminal (123*b* in FIG. 2) may be disposed below the cap plate 125 and the casing 121, respectively. Specifically, the first electrode terminal 123*a* protruding upward may be formed on the cap plate 125 coupled to an upper portion of the casing 121, and the second electrode terminal 123*b* may be formed on a lower surface of the casing 121. As an example, the first electrode terminal 123*a* may be configured as a positive electrode terminal, and the second electrode terminal 123*b* may be configured as a negative electrode terminal.

The electrode assembly 122 may have a structure in which a separator is interposed between electrode plates. The electrode plate may include a positive electrode plate and a negative electrode plate, and the electrode assembly 122 may be formed to be wound in a jelly-roll form with a separator interposed between the positive electrode plate and the negative electrode plate.

An electrode tab 122*a* may be connected to the electrode plate, and the electrode tab 122*a* may be electrically connected to the electrode terminal 123. A positive electrode tab 122*a* may be attached to the positive electrode plate to be connected to the first electrode terminal 123*a* at an upper end of the casing 121. A negative electrode tab (not illustrated) may be attached to the negative electrode plate to be connected to the second electrode terminal 123*b* at a lower end of the casing 121.

The cap plate 125 may include a perforated portion when an internal pressure of the casing 121 is greater than or equal to a preset pressure. Accordingly, when the internal pressure of the casing 121 rises, internal gas of the casing 121 may be discharged externally of the casing 121 through the perforated portion of the cap plate 125.

The battery cell 120 may include a safety element 126 for blocking current by greatly increasing electrical resistance when the internal temperature of the casing 121 rises. The safety element 126 may be, for example, a positive temperature coefficient element (PTC) or a thermal cut-off (TCO) element.

In addition, the battery cell 120 may have a safety valve 127 rupturing to discharge gas when the internal pressure of the casing 121 is greater than or equal to the preset pressure. As an example, the safety valve 127 may have a shape in which a central portion thereof protrudes downward in a normal state, and may rupture when the pressure rises.

The cylindrical battery cell 120 according to the present disclosure is not limited to having the structure described with reference to FIG. 3, and cylindrical battery cells having various known structures may be applied.

Referring to FIG. 4, the plurality of battery cells 120 may be arranged in the housing body 111 to form the cell assembly CS. The heat insulating member 130 may be disposed between the battery cells 120. FIG. 4 illustrates a configuration in which the heat insulating member 130 is disposed in a longitudinal direction Y of the housing body 111, but the arrangement position and number of the heat insulating members 130 may be changed in various manners.

In the detailed description, a cylindrical secondary battery is described as an example of the battery cell 120, but a prismatic secondary battery may be installed instead of the cylindrical secondary battery. Even in the case of the prismatic secondary battery, the electrode terminal 123 may be disposed toward the cover plate 115, and a gas discharge unit rupturing to discharge gas when an internal pressure of the casing 121 is greater than or equal to a preset pressure may be disposed on a portion on which the electrode terminal 123 is disposed among opposite ends of the casing 121. Accordingly, even when the battery cell 120 is formed as the prismatic secondary battery, flame or a combustion material generated in the battery cell 120 may be blocked by the blocking member 160 to prevent the flame or combustion material from being discharged externally through the discharge hole 116.

Next, a battery pack 200 according to an example embodiment of the present disclosure will be described with reference to FIGS. 5 to 7.

Figure 5:
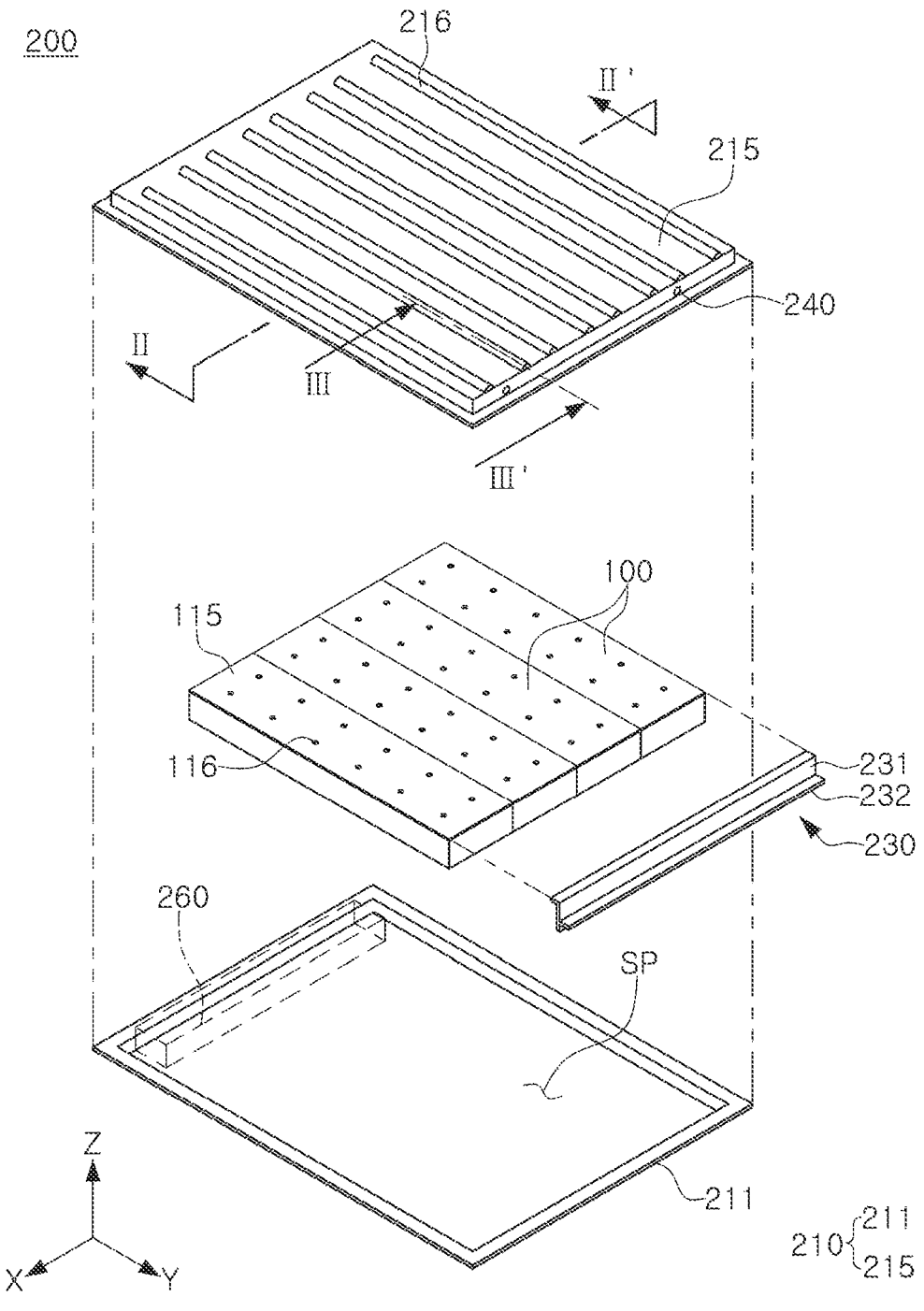
FIG. 5 is a perspective view of a battery pack according to an example embodiment of the present disclosure.

FIG. 5 is a perspective view of the battery pack 200 according to an example embodiment of the present disclosure. FIG. 6 is a cross-sectional view taken along line II-II' of FIG. 5. FIG. 7 is a cross-sectional view taken along line III-III' of FIG. 5.

Figure 6:
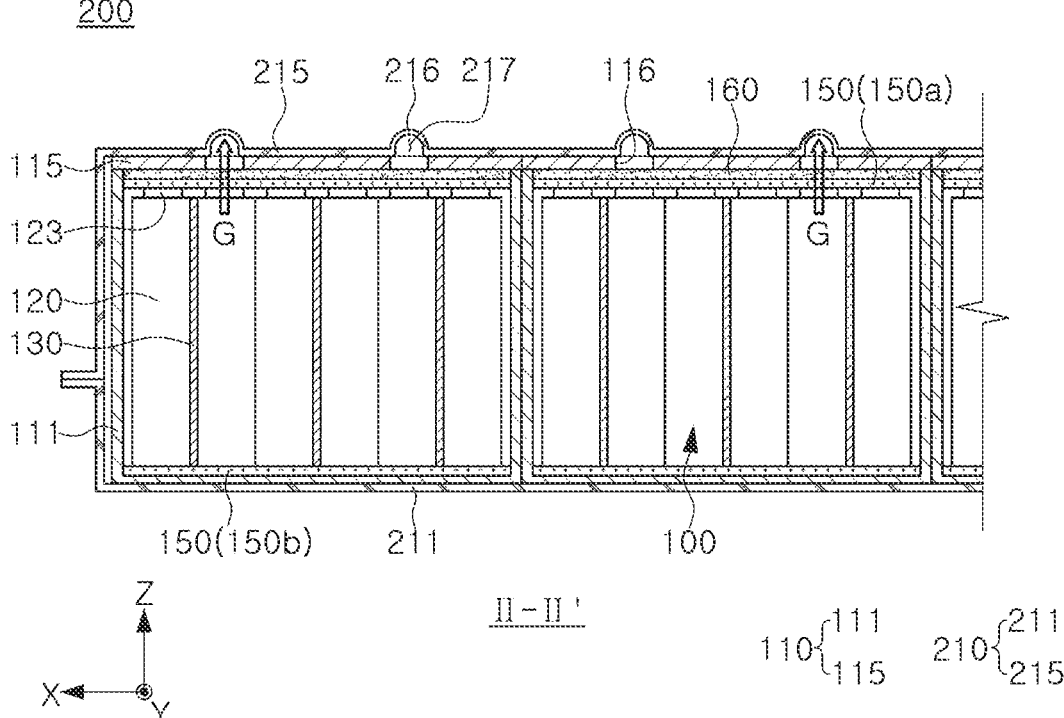
FIG. 6 is a cross-sectional view taken along line II-II' of FIG. 5.
Figure 7:
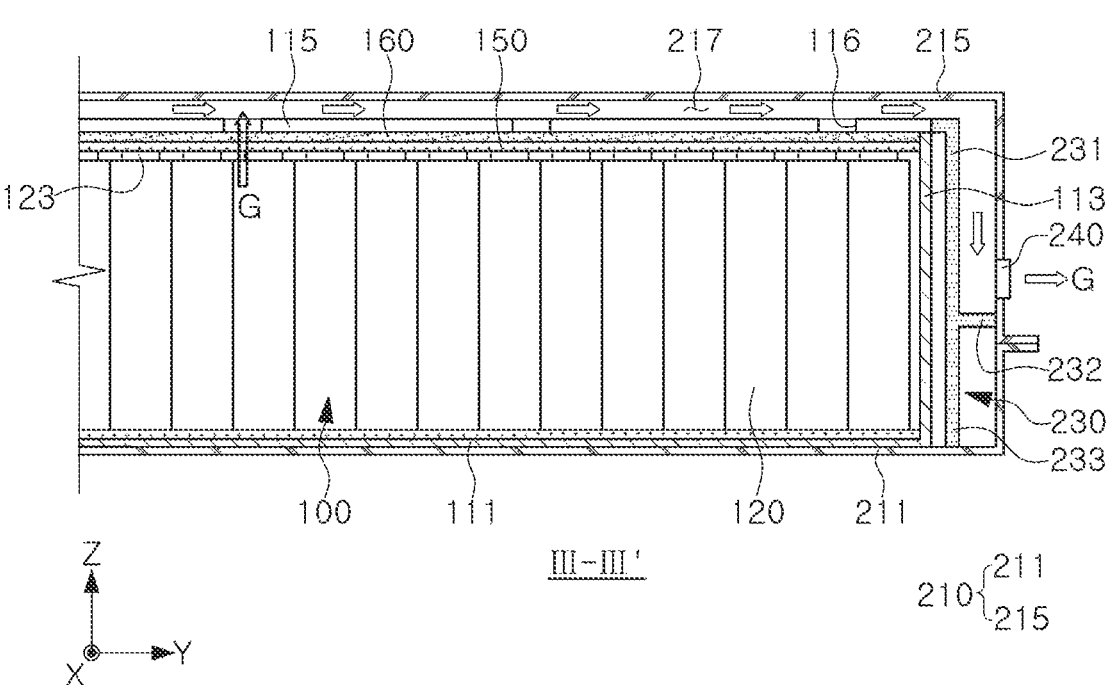
FIG. 7 is a cross-sectional view taken along line III-III' of FIG. 5.

Referring to FIGS. 5 to 7, the battery pack 200 according to an example embodiment of the present disclosure may include a pack case 210 and the battery module 100, and may further include a flow guide member 230.

The pack case 210 may include a bottom case 211 on which the battery module 100 is placed, and a cover case 215 coupled to the bottom case 211. The bottom case 211 and the cover case 215 may be coupled to each other to form an accommodation space SP in which the battery module 100 is accommodated. FIGS. 5 to 7 illustrate a configuration in which a side wall of the pack case 210 is formed in each of the bottom case 211 and the cover case 215, but the side wall of the pack case 210 may be formed only in one of the bottom case 211 and the cover case 215.

A venting unit 240 for discharging gas may be disposed in the pack case 210. The venting unit 240 may be disposed on the side wall of the pack case 210. In the example embodiments of FIG. 5 to 7, the venting unit 240 is illustrated as being disposed on a side wall of the cover case 215, but the venting unit 240 may be disposed on a side wall of the bottom case 211.

The venting unit 240 may include a venting hole formed in the pack case 210 or may include the venting hole and a venting valve installed therein. When the venting unit 240 includes the venting hole, the venting hole may be in an open state all the time. The venting valve used as the venting unit 240 may be open when a pressure of a space in which gas flows is equal to or greater than a preset pressure. Venting valves having various structures and shapes are known, and thus a detailed description thereof will be omitted.

At least one battery module 100 described with reference to FIGS. 1 to 4 may be accommodated in the accommodation space SP of the pack case 210. FIG. 5 illustrates a configuration in which four battery modules 100 are accommodated in the accommodation space SP, but the number of battery modules 100 accommodated in the accommodation space SP may be changed in various manners.

In the battery module 100, the cover plate 115 may have a plurality of discharge holes 116. The plurality of discharge holes 116 may be disposed in a row in a longitudinal direction Y of the battery module 100. For example, each of the battery modules 100 may have a plurality of discharge holes 116 disposed in two rows in the longitudinal direction Y of the battery module 100. In addition, with respect to four battery modules 100, the plurality of discharge holes 116 may form a total of eight rows in the longitudinal direction Y of the battery module 100.

The cover case 215 may include a guide groove 216 to form a flow space 217 in which gas discharged through the discharge hole 116 of the battery module 100 flows. The number of guide grooves 216 provided in the cover case 215 may correspond to the number of rows formed by the plurality of discharge holes 116. That is, when the plurality of discharge holes 116 form a total of eight rows with respect to the entire battery module 100, eight guide grooves 216 may be provided in the cover case 215.

Referring to FIG. 6, the cover case 215 and the cover plate 115 may be disposed in close contact with each other at an edge of the guide groove 216. Accordingly, gas G discharged through the discharge hole 116 of the cover plate 115 may move along the flow space 217 formed between a top surface of the cover plate 115 and the guide groove 216.

The guide groove 216 may have a shape extending in a direction Y of the battery pack 200. The guide groove 216 may extend toward a side wall of the battery pack 200 in which the venting unit 240 is installed. Accordingly, gas flowing through the flow space 217 formed by the guide groove 216 may be discharged externally of the battery pack 200 through the venting unit 240.

The flow guide member 230 may be disposed between a side surface of the battery module 100 and the venting unit 240. The flow guide member 230 may guide the gas flowing through the flow space 217 formed by the top surface of the cover plate 115 and the guide groove 216 to be discharged through the venting unit 240. Referring to FIG. 7, the gas G discharged through the discharge hole 116 may flow in the longitudinal direction Y of the battery module 100 from a top surface of the battery module 100, and then may collide with an inner surface of the side wall of the pack case 210, such that a flow direction of the gas may be switched to a downward direction. The flow guide member 230 may be installed on a portion in which the flow direction of the gas is switched to prevent the gas having the switched direction from flowing into an arbitrary space in the accommodation space SP. Accordingly, the flow guide member 230 may guide the gas having the switched direction to be smoothly discharged through the venting unit 240 after moving to the space in which the venting unit 240 is installed. That is, the flow guide member 230 may guide the gas flowing in the flow space 217 of the guide groove 216 to flow along the inner surface of the side wall of the pack case 210, and then to be discharged through the venting unit 240.

The flow guide member 230 may include a guide portion 231, a blocking portion 232, and a supporting portion 233. The guide portion 231 may be disposed to be spaced apart from an inner surface of the side wall of the pack case 210 to form a space in which gas flows between the guide portion 231 and the inner surface of the side wall. The blocking portion 232 may extend from the guide portion 231 toward the inner surface of the side wall of the pack case 210. The blocking portion 232 may block a space between the venting unit 240 and a bottom surface of the bottom case 211 to limit the flow of gas in a direction of the bottom surface of the bottom case 211. The support portion 233 may extend from the guide portion 231 and/or the blocking portion 232 to be in contact with the bottom surface of the bottom case 211. Accordingly, the guide portion 231 and the blocking portion 232 may be stably supported by the support portion 233.

Figure 8:
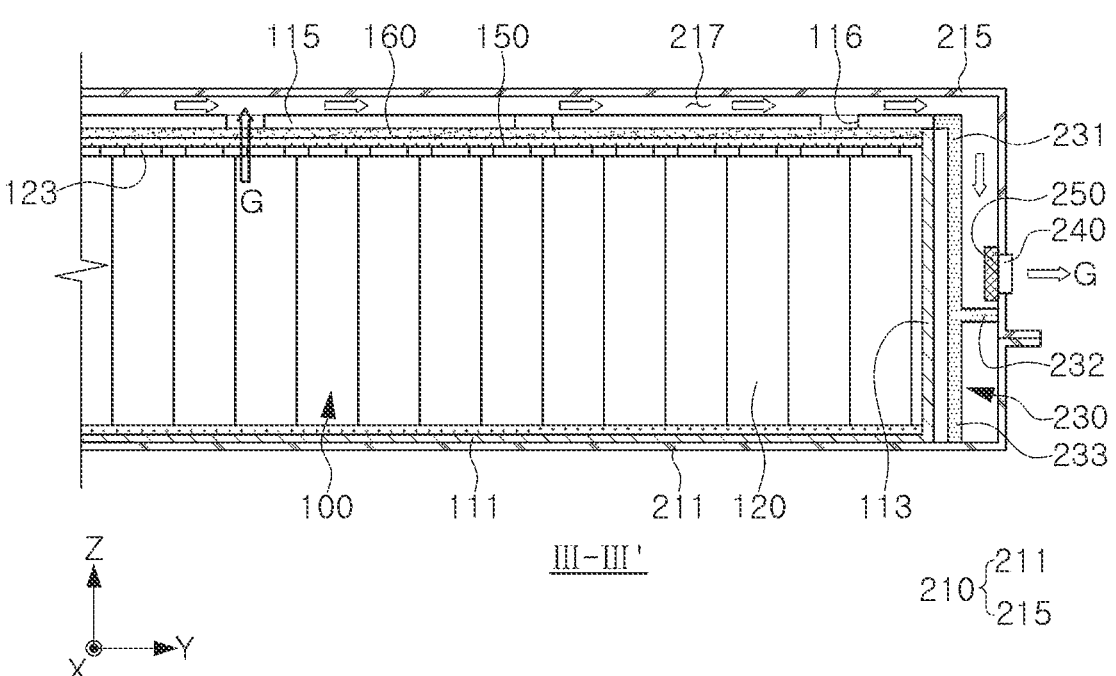
FIG. 8 is a cross-sectional view illustrating a modification of FIG. 7.

Finally, a modification of the battery pack 200 will be described with reference to FIG. 8. FIG. 8 is a cross-sectional view illustrating a modification of FIG. 7.

The battery pack 200 illustrated in FIG. 8 is different from the battery pack 100 illustrated in FIG. 7 only in that an additional blocking member 250 is installed at a front end of the venting unit 240 in a space in which the gas G flows. In order to avoid an unnecessary repeated description, a detailed description of a configuration the same as or similar to that of the battery pack 200 illustrated in FIGS. 5 to 7 will be omitted and replaced with the above description.

The additional blocking member 250 may be disposed between the flow guide member 230 and the venting unit 240. The blocking member 160 provided within the battery module 100 may block flame and/or a combustion material from being discharged. However, a portion of the flame and/or combustion material generated within the battery module 100 may be discharged through the discharge hole

116 to flow in the flow space 217 without being blocked by the blocking member 160. The additional blocking member 250 may block the flame and/or combustion material flowing through the flow space 217 from being discharged externally of the pack case 210 through the venting unit 240.

The additional blocking member 250 may include a mesh filter having a pore in a similar manner to the blocking member 160. The mesh filter may include at least one of a porous metal foam, a metal mesh, and a non-metal porous body. The additional blocking member 250 may be formed of a flame-retardant and heat-resistant material. The additional blocking member 250 may have a configuration the same as that of the blocking member 160, and thus a detailed description of the additional blocking member 250 will be replaced with the above description of the blocking member 160.

While example embodiments have been shown and described above, it will be apparent to those skilled in the art that modifications and variations could be made without departing from the scope of the present disclosure as defined by the appended claims.

For example, the above-described example embodiments may be implemented by deleting some components therefrom, and respective example embodiments may be implemented in combination with each other.

What is claimed is:

1. A battery pack comprising:
a pack case including a bottom case and a cover case coupled to each other to form an accommodation space; and
a plurality of battery modules accommodated in the pack case,
wherein each of the plurality of battery modules includes:
a cell assembly including a plurality of battery cells;
a module housing having an arrangement space for accommodating the cell assembly and a cover plate covering a top surface of the cell assembly and including a plurality of discharge holes for discharging gas generated in the cell assembly; and
a blocking member disposed between the top surface of the cell assembly and the cover plate to block flame or a combustion material from being discharged externally of the module housing through the plurality of discharge holes,
wherein, in each of the plurality of the battery modules, the plurality of discharge holes are disposed in at least one row,
wherein the cover case is structured to cover a plurality of cover plates provided in a plurality of module housings,
wherein the cover case includes a plurality of guide grooves to form a flow space in which the gas discharged through the plurality of discharge holes flows, and
wherein each of the plurality of guide grooves is structured to cover a plurality of discharge holes arranged in a row on any one of the plurality of cover plates and not to cover other discharge holes disposed on other cover plates to prevent a gas discharged from an inside of one battery module from affecting other battery modules.

2. The battery pack of claim 1, wherein
the plurality of battery cells comprise can-type secondary batteries having a plurality of electrode terminals, and
at least one of the plurality of electrode terminals is disposed toward the cover plate.

3. The battery pack of claim 2, wherein
the plurality of battery cells comprise cylindrical secondary batteries, and the plurality of battery cells are arranged in an upright state in the arrangement space.

4. The battery pack of claim 2, wherein an electrode connection member electrically connected to the cell assembly is disposed between the cell assembly and the blocking member.

5. The battery pack of claim 4, wherein the electrode connection member includes an electrically insulating supporting plate and an electrically conductive bus bar supported by the supporting plate.

6. The battery pack of claim 1, wherein the plurality of battery cells comprise can-type secondary batteries including a casing accommodating the electrode assembly and a cap plate covering an open portion of the casing, and the cap plate is disposed toward the cover plate.

7. The battery pack of claim 1, wherein the blocking member includes a mesh filter having a pore.

8. The battery pack of claim 1, wherein the cell assembly includes an insulating member disposed between battery cells to block flame or high-temperature heat energy between adjacent battery cells.

9. The battery pack of claim 1, wherein the gas flowing through the flow space is discharged externally through a venting unit provided in the pack case.

10. The battery pack of claim 9, wherein the venting unit is disposed on a side wall of the pack case, and a flow guide member is disposed between the battery module and the venting unit and the flow guide member guides the gas flowing through the flow space formed by a guide groove to be discharged through the venting unit.

11. The battery pack of claim 10, wherein an additional blocking member is disposed between the flow guide member and the venting unit to block flame or a combustion material from being discharged externally of the pack case through the venting unit.

12. The battery pack of claim 1, wherein a number of the plurality of guide grooves corresponds to a number of rows formed by the plurality of discharge holes.

13. The battery pack of claim 1, wherein the cover case and the cover plate are disposed in close contact with each other at an edge of the guide groove.

14. The battery pack of claim 1, wherein the blocking member includes at least one of a mesh filter having a pore, a porous metal foam, a metal mesh, or a non-metal porous body.

15. The battery pack of claim 1, wherein the blocking member has a pore average size of 400 to 800 μm in a radial direction, and has a melting temperature of 500° C. or higher.

16. A battery pack comprising:

a pack case including a bottom case and a cover case coupled to each other to form an accommodation space; and at least one battery module accommodated in the pack case, wherein the at least one battery module includes:

a cell assembly including a plurality of battery cells;

a module housing having an arrangement space for accommodating the cell assembly and a cover plate covering a top surface of the cell assembly; and a blocking member disposed between the top surface of the cell assembly and the cover plate, wherein the cover plate has at least one discharge hole for discharging gas generated in the cell assembly, wherein the cover case has at least one guide groove to form a flow space in which the gas discharged through the at least one discharge hole flows, and wherein the gas flowing through the flow space is discharged externally through a venting unit provided in the pack case, wherein the venting unit is disposed on a side wall of the pack case, and a flow guide member is disposed between the battery module and the venting unit and the flow guide member guides the gas flowing through the flow space formed by the guide groove to be discharged through the venting unit, wherein the flow guide member has a guide portion disposed to be spaced apart from an inner surface of the side wall of the pack case such that the gas is guided to flow along the inner surface of the side wall of the pack case and then to be discharged through the venting unit, and a blocking portion extending from the guide portion toward the inner surface of the side wall of the pack case to block a space between the venting unit and a bottom surface of the bottom case.

\* \* \* \* \*